US006721539B1

(12) United States Patent
O'Brien et al.

(10) Patent No.: US 6,721,539 B1
(45) Date of Patent: Apr. 13, 2004

(54) COMMUNICATIONS DEVICE RETROREFLECTING INCIDENT MODULATED RADIATION

(75) Inventors: Dominic C O'Brien, Oxford (GB); David John Edwards, Chipping Norton (GB); Stephen J Sheard, Oxford (GB); Grahame Edward Faulkner, Witney (GB)

(73) Assignee: Isis Innovation Limited, Oxford (GB)

( * ) Notice: Subject to any disclaimer, the term of this patent is extended or adjusted under 35 U.S.C. 154(b) by 0 days.

(21) Appl. No.: 09/700,279

(22) PCT Filed: May 11, 1999

(86) PCT No.: PCT/GB99/01386

§ 371 (c)(1),
(2), (4) Date: Jan. 5, 2001

(87) PCT Pub. No.: WO99/59271

PCT Pub. Date: Nov. 18, 1999

(30) Foreign Application Priority Data

May 11, 1998 (GB) ............................................. 9810039

(51) Int. Cl.[7] .............................................. H04B 5/00
(52) U.S. Cl. ........................ 455/41.1; 455/41.2; 455/42; 455/44; 340/10.42
(58) Field of Search ............................. 455/41.1, 41.2, 455/42, 44, 88; 342/42, 44, 45, 51; 340/10.1, 10.3, 10.4, 10.42

(56) References Cited

U.S. PATENT DOCUMENTS

| | | | |
|---|---|---|---|
| 4,134,008 A | * 1/1979 | de Corlieu et al. | ......... 398/170 |
| 4,662,003 A | 4/1987 | Eichweber | |
| 4,983,021 A | 1/1991 | Fergason | ..................... 350/332 |
| 5,091,636 A | 2/1992 | Takada et al. | |
| 5,355,241 A | * 10/1994 | Kelley | ........................ 398/170 |
| 5,422,645 A | 6/1995 | Nettleton et al. | |
| 5,819,164 A | 10/1998 | Sun et al. | ................... 455/106 |

FOREIGN PATENT DOCUMENTS

| | | |
|---|---|---|
| DE | 40 31 043 A1 | 4/1992 |
| GB | 2 240 681 A | 8/1991 |

OTHER PUBLICATIONS

"Optical Two–Way Communication System for Vehicles Using Lasers and Corner Cubes", Toshihiro Tsumura, Hiroshi Okubo, Nubuo Komatsu and Nobuya Aoki, Jul. 1995, pp. 535–538.
"Optical Two–Way Vehicle–To–Vehicle Communication By The Use of Laser and Corner Cube", Toshihiro Tsumura, 1996, pp. 81–86.

* cited by examiner

*Primary Examiner*—Quochien B. Vuong
(74) *Attorney, Agent, or Firm*—Drinker Biddle & Reath LLP

(57) ABSTRACT

A communications device such as a personal identity card is in the form of a badge or label worn on the outside of the wearer's clothing. The badge includes a first layer of a transparent material having an inner surface that is contoured with a retroreflecting repeating pattern. A second layer also of a transparent material has an inner surface with a reciprocating retroreflecting pattern. Sandwiched between the two layers is a layer of liquid crystal material the refractive index of which can be varied through the application of an electric field. When the refractive index of the layer is close to that of the first and second layers, incident radiation passes through the device with little scattering. However, as the refractive index of the layer is varied by application of an electric field, incident radiation is retroreflected from the contoured interface of the first layer with the layer. The communications device is capable of retroreflecting incident radiation and modulating the radiation, by altering the refractive index of the layer, so that the reflected beam is capable of delivering information to a receiver. In this way information can be delivered in a non-contact environment using a device that requires very little power to operate.

12 Claims, 2 Drawing Sheets

…

COMMUNICATIONS DEVICE RETROREFLECTING INCIDENT MODULATED RADIATION

The present invention relates to a communications device that functions as a light transponder that is simple and robust and is suitable for use as a personal information carrier such as an identity card.

Identity cards and other information carriers such as bar codes applied to labels on retail products are commonly use in todays world to enable the people and products assigned with such cards and bar codes to be recognised in an increasingly mechanised and computer controlled environment. To date the development of such information carriers has focused on increasing the amount of fixed information that can be displayed and on the creation of 'smart cards' which are interactive in a computerised environment. In the case of a personal information carrier, for example a travel permit, information is recorded on a magnetic strip that must be passed through a reader to enable the information stored on the card to be read. Similarly, bar codes applied to labels on products are read by a hand-held reader or by a static reader across which the bar code is swiped.

In U.S. Pat. No. 4,983,021 a reflector system is described that is particularly suited for use in the location of an object at a distance. A retroreflecting surface is used to reflect electromagnetic radiation back to a receiver adjacent a transmitter of electromagnetic radiation along the incident path. A separate shutter is provided in front of the retroreflector to selectively interrupt the path of the reflected light and thereby modulate the reflected light. For example, where the shutter is a liquid crystal, the transparency of the liquid crystal is altered from a transparent state to an opaque state.

The present invention seeks to provide a communications device that is suitable for use as a personal information carrier which is simple in construction and for which manufacturing costs are low. Moreover, as a personal information carrier the present invention seeks to provide an optical means (i.e. non-contacting) that is capable of supplying information stored in the device without the need for the carrier to be swiped across a reader. The invention further seeks to provide a communications device that requires only a very small, if any, power supply such as that provided by solar cells.

The present invention provides a communications device comprising a radiation sensor, an adjustable reflection layer having a surface contoured with a retroreflecting shape, modulating means for altering the reflection characteristics of the adjustable reflection layer and a controller in communication with the sensor and the modulating means for controlling changes in the reflection characteristics.

Preferably, the adjustable reflection layer consists of a material having an electric field dependent refractive index in which case the modulation means may comprise biasing means for applying an electric field across the adjustable reflection layer.

In a preferred embodiment the contoured surface of the adjustable reflection layer is in contact with an outer layer that is substantially transparent to incident radiation whereby the refractive index of the adjustable reflection layer is adjustable between a refractive index substantially the same as the refractive index of the outer layer and a refractive index different to the refractive index of the outer layer. A further outer layer may be provided in contact with a surface of the adjustable reflection layer opposite the contoured surface, the interface of the further outer surface and the adjustable reflection layer forming a scattering interface in front of the contoured surface whereby the modulating means adjusts the degree of radiation scattering caused by the scattering interface.

In an alternative embodiment the modulation means comprises a piezoelectric layer in contact with the adjustable reflection layer for applying mechanical vibration to the adjustable reflection layer.

The retroreflected radiation may be amplitude modulated by the adjustable reflection layer. Alternatively or in addition, the retroreflected radiation may be phase/polarisation modulated by the adjustable reflection layer.

It will be understood that reference herein to a surface contoured with a retroreflecting shape is intended as reference to a surface having a repeating three dimensional pattern that is retroreflecting.

Embodiments of the present invention will now be described by way of example with reference to the accompanying drawings, in which.

Figure 1:
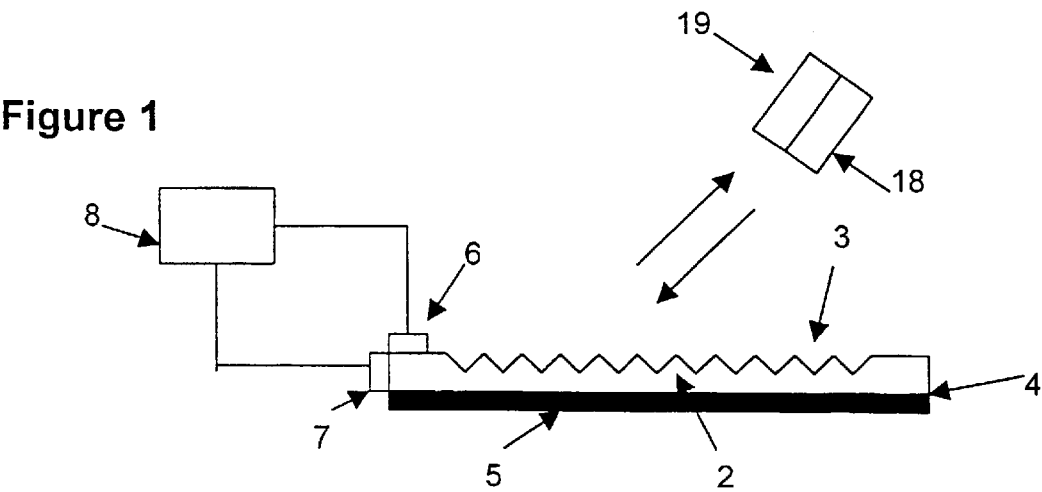
FIG. 1 is a schematic diagram of a first communications device in accordance with the present invention.

The communications device of FIG. 1 consists of an adjustable reflection layer in the form of an active layer 2 of an electro-sensitive material that has a refractive index which varies in dependence upon an applied electrical field. For example, the active layer 2 may consist of a doped semiconductor material having an electric field dependent refractive index. A first surface 3 of the active layer 2 is contoured to describe a surface that retro-reflects, such as a repeating pattern of corner cubes. The opposing second surface 4 of the active layer 2 is planar and is coated in a radiation absorbing material or paint 5.

One or more photodetectors 6 (only one is shown in FIG. 1) are provided preferably on the first surface 3 for detecting electromagnetic radiation incident on the first surface. Alternatively, the photodetectors 6 may be mounted on the second surface 4 of the active layer 2 between the second surface 4 and the radiation absorbing coating 5. Contacts 7 are provided on opposing ends of the active layer 2 to enable an electric field to be applied across the layer. The contacts 7 as well as the one or more photodetectors 6 are connected to a controller 8. The controller 8 controls the electromagnetic field applied to the active layer 2 in response to incident radiation detected by the photodetectors 6 and in dependence on any information for transmission stored in a memory region of the controller. The photodetectors 6 may also act as solar cells generating electrical energy used to maintain operation of the controller 8.

In use, the active layer 2 normally has a refractive index substantially identical to the refractive index of its surroundings $n_s$. In this mode light incident on the first surface 3 passes through the active layer 2 with little reflection or scattering from the first surface and is then absorbed by the light absorbing material 5 on the second surface 4 of the active layer. Therefore little or no light is reflected back by the communications device. The photodetector 6 in combination with the controller 8 are programmed to respond only to incident radiation in the form of a predetermined interrogation signal that may be at a predetermined frequency and/or may be carrying a predetermined varying signal. When an interrogation signal is detected, the controller 8 alters the electric field applied across the active layer 2 via the contacts 7. This in turn alters the refractive index of the active layer to $n_s+\Delta n$ so that the refractive index is different to that of its surroundings. This change in the refractive index of the active layer causes reflection from the first surface 3 of the active layer. The particular contouring of the first surface 3 causes the surface to act as a retroreflector at the altered refractive index so that the incident radiation is reflected back substantially along the path of the incident radiation. The applied electrical field may be varied under the control of the controller 8 so that the retroreflected radiation is modulated to carry information.

The remote interrogator 18 which generates the interrogation signal has a detector 19 adjacent the radiation source to receive the reflected radiation and any information contained in the retroreflected signal.

Figure 2:
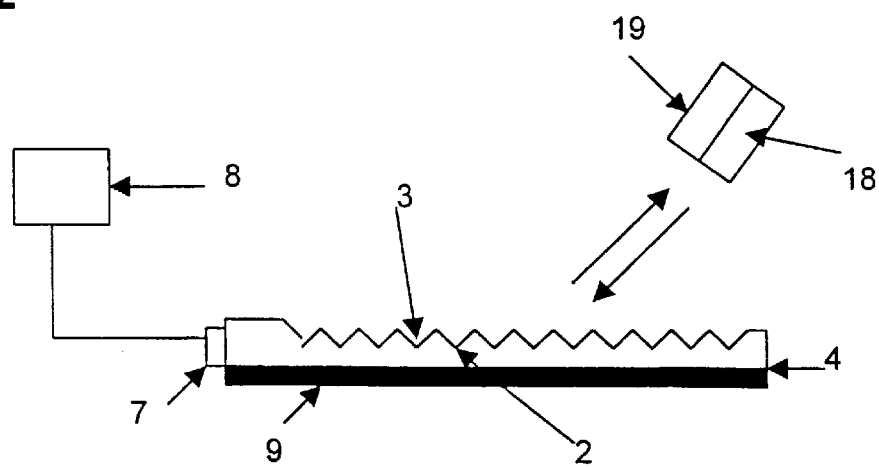
FIG. 2 is a schematic diagram of a second communications device in accordance with the present invention.

In FIG. 2 an alternative communications device/transponder is shown in which the active layer 2 is mounted on a piezoelectric modulating layer 9. The piezoelectric layer 9 is connected to the controller 8 and acts to physically distort the retroreflecting layer 2 thereby modulating the radiation reflected from its retroreflecting surface 3. Piezoelectric devices are capable of operating at frequencies of up to tens of MHz thereby enabling a large amount of data to be transmitted in modulation of the reflected radiation in a very short time.

Figure 3:
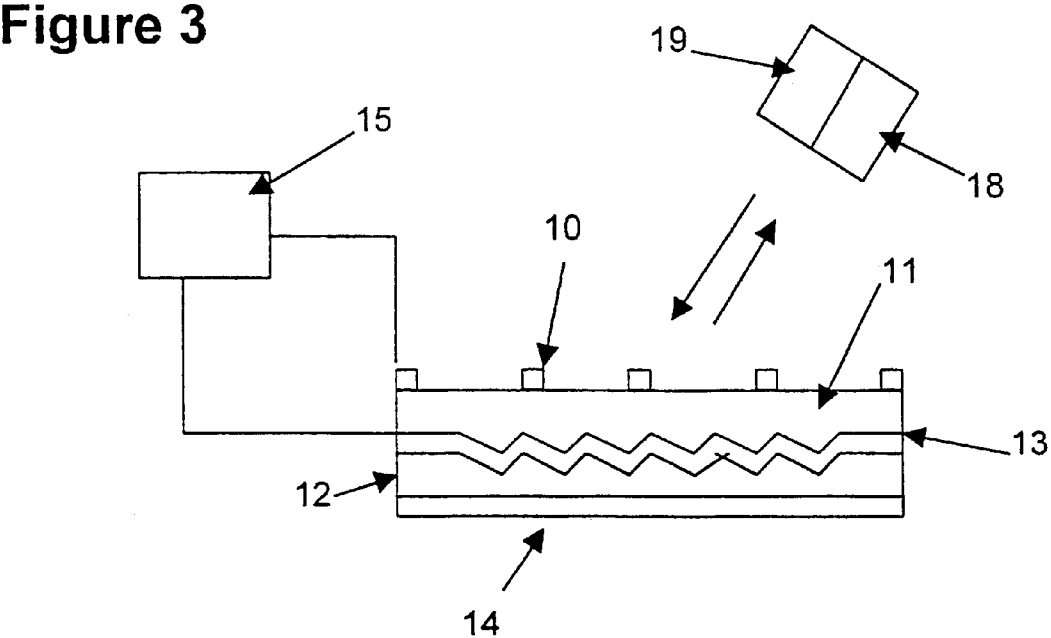
FIG. 3 is a schematic diagram of a third communications device also in accordance with the present invention.

In FIG. 3 a further alternative communications device is shown. The communications device has one or more radiation sensors 10 (five are shown in FIG. 3) mounted on the outer, substantially planar, surface of a first substantially transparent layer 11 of refractive index $n_s$. An opposing inner surface of the first layer 11 is contoured with a repeating 3-D cube corner pattern in relief. A second substantially transparent layer 12 also of refractive index $n_s$ has an inner surface embossed with a reciprocating to repeating 3-D cube corner pattern. As can be seen from FIG. 3, the first and second layers 11, 12 are oriented relative to one another such that their patterned inner surfaces face one another and are laterally aligned so that the projections on the inner surface of the first layer 11 key with the wells on the inner surface of the second layer 12.

The first and second layers 11, 12 are separated by an active layer 13, similar to the active layer of FIG. 1, of electro-sensitive material whose refractive index can be modulated by an applied electric field, the value of the refractive index being variable between $n_a$ and $n_a+\Delta n_a$ such that $n_a \approx n_s$ and $n_a+\Delta n_a \neq n_s$. The outer, substantially planar, surface of the second layer 12, opposite the inner patterned surface, is covered by a radiation absorbing layer 14.

A controller 15 communicates with the radiation sensor 10 and is connected to the active layer 13 by contacts (not shown) arranged to enable an electric field to be applied across the active layer. In a similar manner to that described with reference to the device of FIG. 1, the controller 15 controls the applied electric field in response to the sensors 10 detecting an interrogation signal and encodes the retroreflected signal by intensity modulation of the retroreflected signal.

When the active layer 13 is in a state such that its refractive index is substantially the same as that of the first and second layers 11, 12, most radiation incident on the device is transmitted through the first layer 11, the active layer 13 and the second layer 12 to the radiation absorbing layer 14. This layer prevents unwanted reflections from the back surface of the device and preferably has photo-electric properties so that transmitted light may be used to power the device, although a small battery may also be used (not shown). When the active layer 13 is in a state such that its refractive index is different to that of the first and second layers 11, 12, reflection of incident radiation occurs at the interfaces of the active layer 13 with the first and second layers 11, 12. The contours of the surfaces at the interfaces ensure incident radiation is retroreflected back along the path of the incident radiation.

Figure 4:
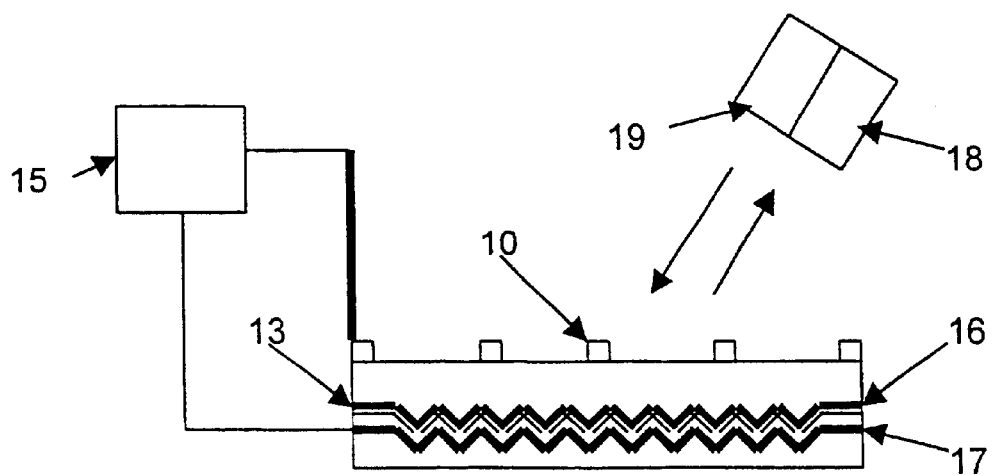
FIG. 4 is a schematic diagram of a fourth communications device in accordance with the present invention.

FIG. 4 shows a further alternative communications device or transponder in which, as before, the substantially transparent layers 11, 12 are separated by an active layer 13. However, in FIG. 4 the interface between the first substantially transparent layer 11 and the active layer 13 is a scattering interface 16. With this arrangement, when the refractive index of the active layer 13 is substantially identical to the refractive index of the first and second layers 11, 12, incident radiation is scattered in all directions by the scattering interface 16. When the refractive index of the active layer 13 is changed by the application of an electric field, the scattering interface 16 disappears as far as the incident radiation is concerned and scattering is greatly reduced. Instead, the incident radiation encounters the retroreflecting interface 17 between the active layer 13 and the second layer 12, causing most of the radiation to return along the same path. It will be understood that with the transponder shown in FIG. 4, modulation of the retroreflected signal is performed by the 'removal' of the scattering interface 16.

Although the layers 11,12 of the devices shown in FIGS. 3 and 4 are described as having the same refractive index it is envisaged that the layers may have different refractive indexes in which case retroreflection of the incident radiation may occur at only one interface with the active layer. Furthermore, whilst the above description refers to amplitude modulation of the retroreflected signal, changes in the characteristics of the active layer such as its refractive index may also cause phase/polarisation modulation of the retroreflected signal.

The type of detector 19 used, adjacent to the source 18 of incident radiation, will determine which type of modulation is monitored to extract any information contained in the modulated return signal.

The controller 8, 15 may include a small power supply (not shown) in the form of a watch battery, solar cell or the like. In a preferred form, the communications device is only actuated when an interrogation signal is detected by the photodetector 6 or the sensors 10. Therefore, power is only needed to drive the modulation of the active layer 2, 13 and so only a very small power supply is required. Of course, in the case of FIGS. 3 and 4 power may be required to maintain the refractive index of the active layer in its non-reflecting state. As mentioned above, the data transponder/communications device may include a solar cell so that incident light is used to power the device.

Any suitable adjustable refractive index material may be employed for the active layer 2, 13. The material may be a doped semiconductor material such as a III/V semiconductor system or may be a liquid crystal such as a ferro-electric or electroclinic liquid crystal. With such materials data can be transmitted with the reflected radiation at rates of between 10–100 kbits/s. As a retroreflecting pattern is employed, the limit on the angular sensitivity of the device is primarily limited by the operating characteristics of the active layer. Various ways are generally known for improving the light budget and angular sensitivity of liquid crystals in particular and such improvements are incorporated herein.

With liquid crystals, although direct video transmission using amplitude modulation is relatively bandwidth efficient, it has limited noise immunity so that a large amount of power must be transmitted to ensure a high quality received signal. In many cases the environment the communications device is likely to be used in will be subject to noise from ambient and artificial light and so modulation schemes other than direct amplitude modulation are preferred. Such preferred modulation schemes include Phase Shift Keying (PSK) and Quadrature Amplitude Modulation (QAM) that are highly bandwidth efficient and relatively power efficient. In experiments QAM has been found to be consistently superior.

Although in many cases full modulation of the transmitted power may be assumed, at high frequencies the response of the liquid crystal is unlikely to allow this. Thus in experiments measuring the frequency response of ferroelectric and electroclinic liquid crystals, a 16 dB/decade and a 20 dB/decade roll off in optical response was found for the liquid crystals respectively. The power efficiency of 2, 4, 8, 16 and 32 level modulation schemes with respect to bit rate have been studied. In general at bit rates below the cut-off frequency it has been found that 2 level schemes are the most efficient. However, as the bit rate rises 16 and 32 level schemes have been found to be more power efficient. With the best QAM scheme approximately 15 dB better than that achieved using multi-level amplitude modulation schemes.

QAM schemes consist of amplitude and phase modulation of the electric signal to create a constellation of signals. This can be achieved using electrical phase modulation of the drive waveforms to the liquid crystal cell and using a number of cells to modulate the illuminating radiation. Thus, a 16 level scheme may consist of four, separately driven, ferroelectric cells arranged so that the areas of each are in the proportion 1:2:4:8.

When in use, for example as a travel permit, the communications device is worn as a card on the outside of a person's clothing. As the person approaches the access to a terminal, the person passes an interrogation unit or reader that consists of a radiation source 18 and a reader 19. Radiation from the source 18 is incident on the photodetector 6 or sensors 10 of the permit and activates the controller 8, 15. The controller is enabled and radiation incident on the permit, irrespective of its angle of incidence, is reflected back along the same path by the retroreflecting surface or interface. The amplitude/phase/polarisation of the reflected radiation is altered by the variation in the characteristic of the active layer such as its refractive index so that the reflected radiation acts as a carrier for the information to be delivered to the reader 19. As the reflected radiation passes along substantially the same path as the incident radiation, the reader 19 is located adjacent the radiation source 18. Once the reflected radiation is detected, the reader 19 authenticates the permit on the basis of the information contained in the modulation of the reflected radiation.

The communications devices described above may be used as an identity card or tag, as a travel permit or as product marking for warehouse management. In such cases preferably the transponder is approximately the size of a credit card. However, an alternative application of the transponder is as a road sign, signal or other road feature such as cats eyes. Where the transponder is used as a road sign it may be much larger, for example around half a meter in diameter. With this alternative application, the transponder is located at the side of the road and is activated by light from vehicle headlights, for example. The information provided by the transponder may be in the form of identification of approaching junctions for use with an onboard vehicle navigation system, for example.

The communications device may also be used in smart card applications, for example as part of an automatic road tolling system. The communications device will have stored in a memory a unique identification and details on the number of pre-paid journeys. The communications device is mounted for example at a corner of a windscreen so that as the vehicle passes a toll that includes a radiation source and an adjacent reader, the communications device is activated to modulate the reflected radiation to provide the information stored in its memory. In this way the toll will be able to determine whether the car has sufficient credit to continue along the road. An advantage of this device is that it is relatively insensitive to angular displacement due to the retroreflecting action of the active layer.

A further potential use envisaged for the communications device is in the power distribution network. By mounting the communications device on electric pylons, the proximal electric field from the cabling may be used to modulate the refractive index of the active layer of the communications device. Hence radiation reflected from the communications device would indicate current values and frequency.

With the embodiments described above the interrogating incident radiation is continuous, however, it is envisaged that the interrogating beam may itself be modulated to enable more sophisticated communication between the interrogation unit and the transponder. In this configuration it would be possible to add new data into the memory of the transponder or smart card. Alternatively, data can be introduced by a separate programming unit to which the transponder can be connected.

What is claimed is:

1. A communications device comprising a radiation sensor, an adjustable reflection layer having a surface contoured with a retroreflecting shape, modulating means for altering the reflection characteristics of the adjustable reflection layer and a controller in communication with the sensor and the modulating means for controlling changes in the reflection characteristics of the adjustable reflection layer, the adjustable reflection layer including a material having an electric field dependent refractive index whereby adjustment of the refractive index of the reflection layer relative to the refractive index of its surroundings adjusts the reflection characteristics of the reflection layer.

2. A communications device as claimed in claim 1, wherein the modulation means comprises biasing means for applying an electric field across the adjustable reflection layer.

3. A communications device as claimed in claim 1, wherein the contoured surface of the adjustable reflection layer is in contact with an outer layer that is substantially transparent to incident radiation whereby the refractive index of the adjustable reflection layer is adjustable between a refractive index substantially the same as the refractive index of the outer layer and a refractive index different to the refractive index of the outer layer.

4. A communications device as claimed in claim 3, wherein a further outer layer is provided in contact with a surface of the adjustable reflection layer opposite the contoured surface, the interface of the further outer surface and the adjustable reflection layer forming a scattering interface in front of the contoured surface whereby the modulating means adjusts the degree of radiation scattering caused by the scattering interface.

5. A communications device as claimed in claim 1, wherein the modulation means comprises a piezoelectric layer in contact with the adjustable reflection layer for applying mechanical vibration to the adjustable reflection layer.

6. A communications device as claimed in claim 1, wherein the radiation sensor is in the form of one or more detectors.

7. A communications device as claimed in claim 1, further including a radiation absorbing layer provided behind the contoured surface of the adjustable reflection layer.

8. A communications device as claimed in claim 1, wherein the retroreflected radiation is amplitude modulated by the adjustable reflection layer.

9. A communications device as claimed in claim 1, wherein the retroreflected radiation is phase/polarisation modulated by the adjustable reflection layer.

10. A road sign comprising one or more communications devices as claimed in claim 1.

11. An identification card consisting of a communications device as claimed in claim 1.

12. An electric power monitoring device comprising an adjustable reflection layer having a surface contoured with a retroreflecting shape, the adjustable reflection layer including a material having an electric field dependent refractive index, and means for mounting the monitoring device proximate an electrical supply such that the refractive index of the adjustable reflection layer is responsive to an electric field generated by a proximate electrical supply whereby adjustment of the refractive index of the reflection layer relative to the refractive index of its surroundings adjusts the reflection characteristics of the reflection layer.

\* \* \* \* \*